United States Patent
Hosny (10) Patent No.: US 10,909,603 B2
(45) Date of Patent: Feb. 2, 2021

(54) COMPUTER IMPLEMENTED ITEM RECOMMENDATION

(71) Applicant: MASTERCARD INTERNATIONAL INCORPORATED, Purchase, NY (US)

(72) Inventor: Ahmed Hosny, Port Laoise (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 464 days.

(21) Appl. No.: 15/839,636

(22) Filed: Dec. 12, 2017

(65) Prior Publication Data
US 2018/0165748 A1 Jun. 14, 2018

(30) Foreign Application Priority Data
Dec. 13, 2016 (EP) .................................. 16203887

(51) Int. Cl.
*G06Q 30/00* (2012.01)
*G06Q 30/06* (2012.01)
(Continued)

(52) U.S. Cl.
CPC ....... *G06Q 30/0631* (2013.01); *G06Q 10/087* (2013.01); *G06Q 20/12* (2013.01);
(Continued)

(58) Field of Classification Search
CPC .. G06Q 30/0631; G06Q 10/087; G06Q 20/12; G06Q 30/0282; G06Q 30/0635; G06Q 30/0641
(Continued)

(56) References Cited

U.S. PATENT DOCUMENTS

2011/0022517 A1* 1/2011 Hammad ............... G06Q 20/12
705/44
2014/0101036 A1* 4/2014 Phillips ............... G06Q 20/027
705/39
(Continued)

OTHER PUBLICATIONS

"QSRs show mobile market the way to users' hearts is through their stomachs," Amir Ghodrati/App Annie Director of Market Insights in a mobiledriven world. QSR Web. News Features [Louisville] Oct. 14, 2016; Dialog #1829467685, 4pgs. (Year: 2016).*

*Primary Examiner* — Robert M Pond
(74) *Attorney, Agent, or Firm* — Harness, Dickey & Pierce, P.L.C.

(57) ABSTRACT

The present disclosure relates to a method and system for providing item recommendations to a user in a virtual marketplace. A virtual persona associated with a primary account number is identified. A merchant data request message requesting merchant data identifying preferred merchants to whom transactions have been made from the first payment account using the PAN is sent to a first remote server. In response, a set of merchant data associated with preferred merchants is received from the first remote server. An item data request message requesting item data associated with the preferred merchants is sent to a second remote server. In response, a set of item data associated with items that are associated with at least one of the preferred merchants is received from the second remote server. A recommendation of at least one of the items is provided to the user.

18 Claims, 8 Drawing Sheets

(51) Int. Cl.
    *G06Q 10/08*    (2012.01)
    *G06Q 20/12*    (2012.01)
    *G06Q 30/02*    (2012.01)

(52) U.S. Cl.
    CPC ..... *G06Q 30/0282* (2013.01); *G06Q 30/0635* (2013.01); *G06Q 30/0641* (2013.01)

(58) Field of Classification Search
    USPC .................................................... 705/26, 27
    See application file for complete search history.

(56) References Cited

U.S. PATENT DOCUMENTS

| | | | |
|---|---|---|---|
| 2014/0279185 A1* | 9/2014 | Merz | G06Q 30/0282 705/26.7 |
| 2015/0032565 A1 | 1/2015 | Weis et al. | |
| 2015/0088692 A1* | 3/2015 | Fung | G06Q 30/0623 705/26.61 |
| 2015/0186836 A1 | 7/2015 | Chouhan et al. | |
| 2015/0302510 A1 | 10/2015 | Godsey et al. | |
| 2015/0324881 A1* | 11/2015 | Ouimet | G06Q 30/02 705/14.49 |
| 2016/0125460 A1* | 5/2016 | Zellner | G06Q 30/0255 705/14.53 |

* cited by examiner

COMPUTER IMPLEMENTED ITEM RECOMMENDATION

CROSS-REFERENCE TO RELATED APPLICATION

This application claims the benefit of and priority to European Patent Application No. 16203887.1 filed Dec. 13, 2016. The entire disclosure of the above application is incorporated herein by reference.

FIELD

The present disclosure relates to a method and system for providing item recommendations to a user in a virtual marketplace. In particular, an aspect relates to a method and system for generating grocery recommendations for orders made through a smart appliance, wherein the grocery recommendations are based, in part, on previous payment authorizations made by a user associated with the smart appliance.

BACKGROUND

This section provides background information related to the present disclosure which is not necessarily prior art.

It is becoming increasingly common for household appliances to have computing capabilities and internet connectivity. One such appliance is a smart refrigerator, which typically includes a computer system that includes inputs/outputs, such as through user interface devices, e.g., a touch screen, and is coupled to the Internet via a local wired or wireless network. Such a computer system may be added to a conventional refrigerator, e.g., a tablet attached to the refrigerator, or integrated or embedded within the refrigerator at the time it is manufactured.

The computing capability and connectivity of the smart refrigerator may be used in order to purchase goods using the smart refrigerator through a virtual marketplace, such as the MasterCard® grocery store.

A well understood problem in the field of virtual marketplace shopping is that customers are presented with a large number of items, of which only a relatively small number are relevant to the customer's requirements. In order for the customer to identify items that are relevant to them, they must either submit a number of search requests to a server of the virtual marketplace, or they must browse through a large list of possible items. Both of these processes places a large processing burden on the servers of the virtual marketplace, as the servers are required to respond to a large volume of search requests or to generate and present a long list of possible items.

One method of addressing this problem is for users to present very specific search criteria that are likely to return a large number of relevant items and a small number of irrelevant items. For example, one known method requires that a user provides a recipe to a computer server, and the computer server responds with a list of possible items that could be used in that recipe. Such a solution is limited in that it requires significant user interaction to prepare or select a recipe to form part of the search request. Another problem with this method is that it does not take into account any other input factors and, therefore, excludes a number of relevant items that do not form part of the recipe. This requires the user to perform further search requests to gather excluded items and, therefore, still places a large processing burden on the servers of the virtual marketplace.

There is increasing need for a method and system for accurately recommending items that are relevant to a user without placing undue burden on the servers of the virtual marketplace by performing numerous search requests or by retrieving and displaying details of a large number of items that are not relevant to the user.

SUMMARY

This section provides a general summary of the disclosure, and is not a comprehensive disclosure of its full scope or all of its features. Aspects and embodiments of the disclosure are set out in the accompanying claims.

According to a first aspect, there is provided a computer-implemented method for providing item recommendations to a user, the method comprising: identifying, at a first server, a virtual persona for receiving recommendations, the virtual persona being associated with a first primary account number (PAN) associated with a first payment account; sending, to a first remote server having an authorization data database stored thereon, a merchant data request message requesting merchant data associated with transactions made using the first PAN, wherein the merchant data request message comprises either the first PAN or a token PAN associated with the first PAN, receiving, in response to the merchant data request message, from the first remote server, a first set of merchant data associated with preferred merchants to whom payments have been made using the first primary account number, sending, to a second remote server having a merchant item database stored thereon, an item data request message, the item data request message requesting item data associated with the preferred merchants, wherein the item data request message comprises a subset of the first set of merchant data in order to identify the preferred merchants, receiving, in response to the item data request message, from the second remote server, a first set of item data, the first set of item data comprising data associated with items that are associated with at least one of the preferred merchants, and providing item recommendations to a user associated with the virtual persona, the item recommendations comprising a recommendation of at least one of the items associated with the first set of item data.

Further areas of applicability will become apparent from the description provided herein. The description and specific examples and embodiments in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. Aspects of the present disclosure will now be described by way of example with reference to the accompanying figures. In the figures.

Corresponding reference numerals indicate corresponding parts throughout the several views of the drawings.

DETAILED DESCRIPTION

Embodiments of the present disclosure will be described, by way of example only, with reference to the drawings. The description and specific examples included herein are intended for purposes of illustration only and are not intended to limit the scope of the present disclosure. That said, the following description is presented to enable any person skilled in the art to make and use the system, and is provided in the context of a particular application. Various modifications to the disclosed embodiments will be readily apparent to those skilled in the art.

The present disclosure provides for a method and system in which data contained in the payment authorization messages from previous payment authorizations associated with a virtual persona is used to provide recommendations for purchases at a virtual marketplace. The methods and system provided are capable of reducing the processing and communication burden on the server of a virtual marketplace by reducing the number of unnecessary item information requests required by a user to obtain items that are relevant to the user.

The detailed description as follows is made with reference to purchases made through a virtual marketplace, such as the MasterCard® Grocery store, and being made through a smart appliance, such as the Samsung® RF22K9581SR Family Hub smart refrigerator. The skilled person will recognize, however, that the principles contained herein may be applied and/or adapted to other systems of online retail using other devices for identifying and paying for goods. For example, the system could be used with a smart phone comprising secure payment functionality, or with a personal computer.

Figure 1:
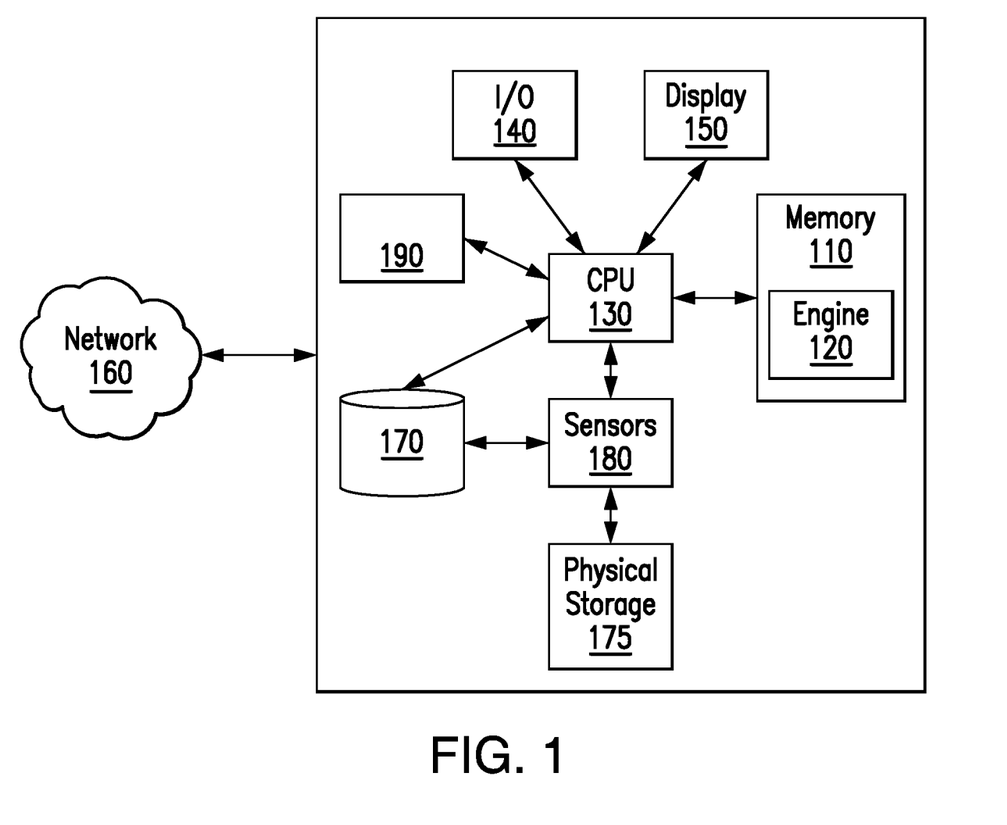
FIG. 1 is a schematic representation of an example smart appliance suitable for accessing a virtual marketplace.

FIG. 1 shows a schematic diagram of a smart appliance system 100 that is suitable for accessing a virtual marketplace such as the MasterCard® Grocery store. The smart appliance system 100 generally combines a primary function with computing and communication capabilities; for example, one example of a smart appliance is a smart refrigerator, which combines the physical capability of providing refrigerated storage 175 with computing and communication capabilities. The smart appliance system 100 comprises memory 110 hosting an engine 120 that implements functionality of the smart appliance 100, a central processing unit (CPU) 130, input/output devices 140, such as a keyboard or speakers, including a display 150 (e.g., a touch screen display). The smart appliance 100 further comprises a wireless or wired controller 190 for facilitating and controlling a wireless or wired connection of the smart appliance 100 with a communications network 160, and may further include a smart data storage 170 for maintaining electronically stored details relating to the primary function of the smart appliance 100, such as details of the contents of a smart refrigerator, and optionally additional informational data (such as one or more operating characteristics of the device; for instance, the operating temperature of a smart refrigerator). The smart data storage 170 can, for example, be in the form of a database. It can be internal to the smart appliance 100 or external, for example, employed on a server located in the user's dwelling, or remote to the user's dwelling. Smart data can be gathered for storage in the smart data storage 170 through one or more sensors 180 incorporated in the smart appliance 100. For instance, the sensors could be RFID tag readers for detecting and recognizing items placed into a physical storage section 175 of a smart refrigerator for storage.

Figure 2:
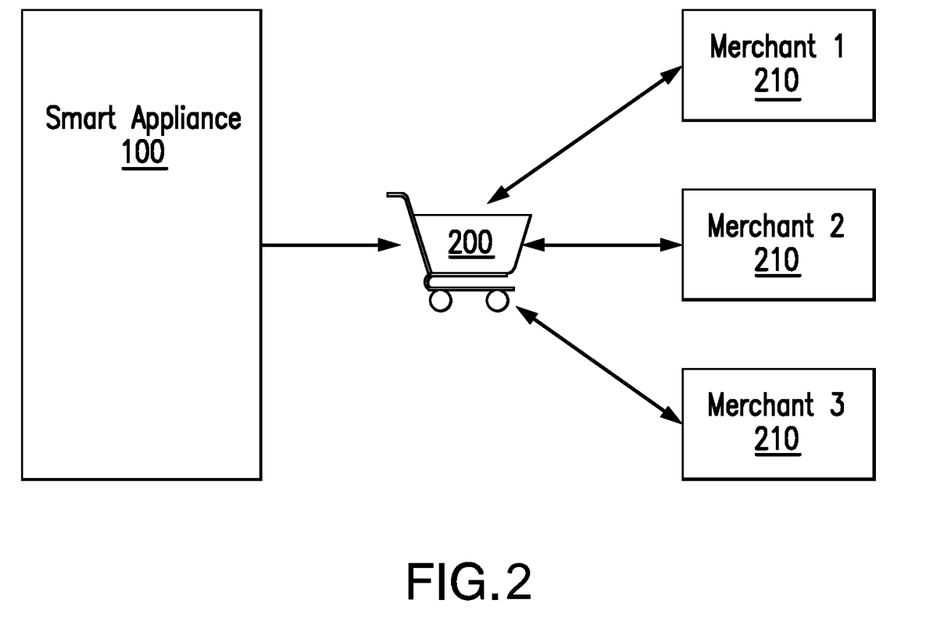
FIG. 2 is a schematic representation of an example relationship between a virtual marketplace, a smart appliance and merchants.

The smart appliance 100 can be used to access a virtual marketplace 200 as illustrated schematically in FIG. 2. The virtual marketplace 200 is run on one or, more usually, a plurality or interconnected servers and may be accessed by a smart appliance 100 or another electronic device via an internet connection. The virtual marketplace 200 acts as a hub, through which users can place orders for items sold by several different merchants 210. Users place orders at the servers of the virtual marketplace 200, which are then processed and sent on to servers belonging to the computer systems of the individual merchants.

FIG. 2 shows the relationships between the smart appliance 100, the virtual marketplace 200, and a plurality of merchants 210. Typically, each of the plurality of merchants 210 will have an agreement with the virtual marketplace 200, allowing the merchants 210 to be integrated into the virtual marketplace 200 such that their products are available for sale though the virtual marketplace 200. A user may access the virtual marketplace 200 through the smart appliance 100, which is in communication with the virtual marketplace 200 through the wired or wireless controller 190. A user can select products available from any of the plurality of merchants 210 using a user interface of the smart appliance 100 to be added to a virtual shopping basket for purchase.

Figure 3:
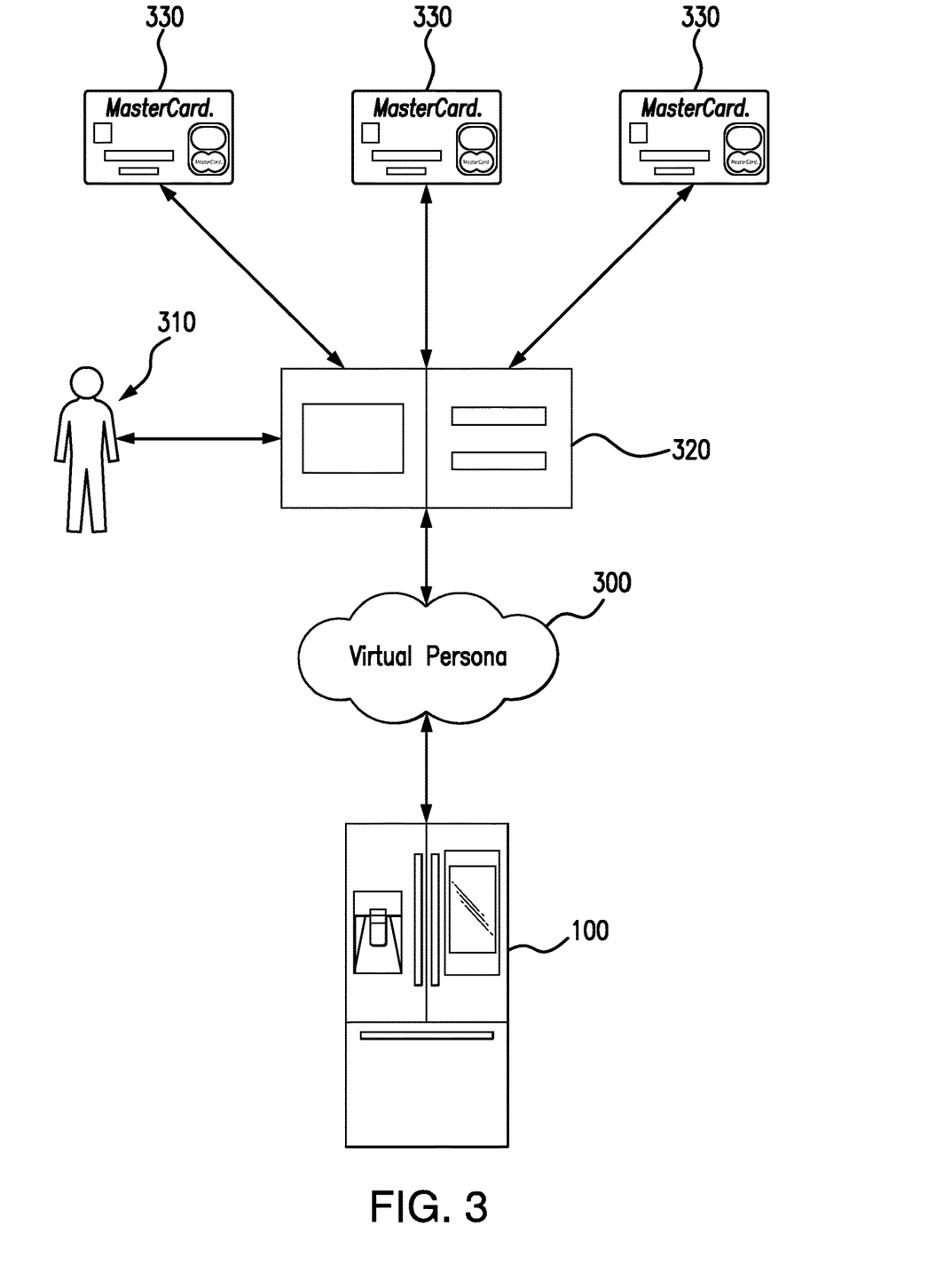
FIG. 3 is a schematic representation of an example of a virtual persona.

Purchases can be made by a user using a virtual persona 300, as is schematically represented in FIG. 3. The virtual persona 300 is typically stored at a remote location from the smart appliance 100 and is operated and maintained by a third party. The virtual persona 300 is associated with a user 310, who creates and registers the virtual persona 300 to his identity. Further objects can be registered to the virtual persona 300, such as a smart appliance 100 and a digital wallet 320 (e.g., the MasterPass® digital wallet). The digital wallet 320 may comprise credentials relating to one or a plurality of payment cards 330. The credentials could include the primary account numbers (PAN) associated with at least one of the payment cards 330 or a token PAN associated with at least one of the payment cards 330. Data relating to the virtual persona 300 is stored at a server, either at the same location as the virtual marketplace 200 or at a different remote location.

When making purchases within the virtual marketplace 200, the user 310 is identified through the associated virtual persona 300. After collecting a number of items in the virtual shopping basket, the user 310 can proceed to pay for the items using the credentials stored in digital wallet 320. Typically, the user 310 sends payments directly to the virtual marketplace 200. The virtual marketplace 200 then forwards the payments to the correct merchants 210 from whom the items are supplied. In some examples, however, the payments may be sent directly to the merchants 210 supplying the items.

Figure 4:
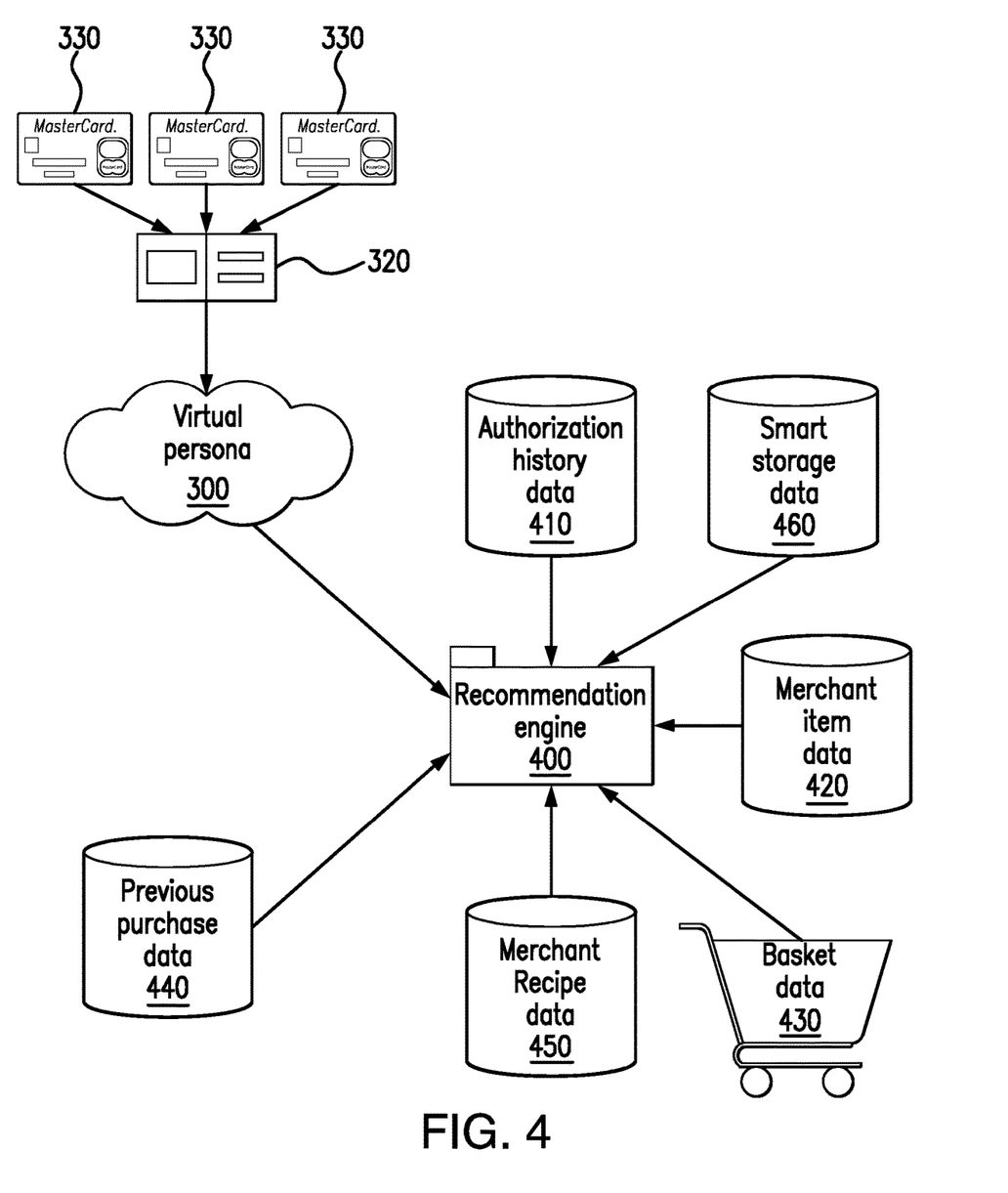
FIG. 4 is a schematic representation of an example system for providing item recommendations.

When a user accesses the virtual marketplace 200 using the user interface of the smart appliance 100, the user 310 is provided with one or more item recommendations. In order to provide the user 310 with item recommendations, data relating to the virtual persona 300 is combined by a recommendation engine 400 that implements a predetermined algorithm to select one or more items from a list of available items. FIG. 4 shows a schematic representation of different types of data that may be provided to a recommendation engine 400 of the virtual marketplace 200 in order to generate item recommendations.

In the system depicted in FIG. 4, each of the data sources are located on different remote servers. The data sources could alternatively be provided on a single server. Furthermore, the data sources could be provided on the same server on which the recommendation engine 400 is provided.

The recommendation engine 400 can be stored on memory forming part of the computing systems of the virtual marketplace 200 or, alternatively, be provided at a remote location from the computing systems of the virtual marketplace 200.

As part of a method for providing item recommendations, merchant item data 420 is provided to the recommendation engine 400. The merchant item data 420 is stored on a merchant item database and comprises details of all of the items that are available from any of the merchants 210 that are integrated into the virtual marketplace 200.

The merchant item data 420 comprises a list of items, each item being associated with multiple information tags relating to an aspect of the item. For example, for each item, the merchant item data 420 could comprise an item name, a merchant name, a cost, a list of recipes including the item etc. Merchant item data 420 is provided to the recommendation engine 400 in response to a request from the recommendation engine 400. For example, the recommendation engine 400 can request all merchant item data 420 associated with a given merchant 210, or all merchant item data 420 having an associated cost below a given value. More restrictive requests can combine requirements; for example, by requesting all merchant item data 420 associated with a given merchant and having an associated cost below a given value.

Authorization history data 410 can also be provided to recommendation engine 400. The authorization history data 410 is stored on an authorization history database and comprises details relating to previous payment authorizations made using payment cards 330 associated with the digital wallet 320.

Authorization history data 410 can comprise data included in the authorization request messages sent during previous payment authorizations made using payment cards 330 associated with the digital wallet 320. Preferably, the authorization history data 410 should comprise information that corresponds to information contained in merchant item data 420 stored in the merchant item database, so that the respective data sets can be compared efficiently by the recommendation engine 400. For example, the name of the receiving merchant associated with a transaction in the authorization history data 410 should correspond with the name of the same merchant indicated as associated with an item in the merchant item data 420.

Typically, authorization history data is stored for a number of different virtual personas 300. The recommendation engine 400 can identify which virtual persona 300 is accessing the virtual marketplace 200, so that authorization history data relating to the correct user is provided to the recommendation engine 400 to form item recommendations. Because a single virtual persona 300 can be identified with a plurality of payment cards 330 or payment devices, the authorization history data 410 can include authorization history from several payment streams.

Authorization history data 410 may indicate data relating to transaction authorizations and payment authorizations.

Alternatively, authorization data requests from the recommendation engine 400 can include a PAN or token PAN in order to identify payment history relating to the correct user; the authorization history database then responds with authorization history data 410 relating to the particular PAN or token PAN provided with the request.

The use of authorization history data 410 allows the recommendation engine 400 to select items from the merchant item database that correspond with the user's shopping habits on other platforms, thereby increasing the specificity of the recommendation. The use of authorization history data 410 provides data stream that can combine purchase histories over a number of platforms, including face to face purchases.

Virtual basket data 430 can also be provided to the recommendation engine 400, the virtual basket data 430 comprising details of items which are currently in the user's virtual basket.

Previous purchase data 440 can be provided to the recommendation engine 400, the previous purchase data comprising details relating to previous purchases made by the user/virtual persona 300 through the virtual marketplace 200.

Smart storage data 460 can be provided to the recommendation engine 400, the smart storage data 460 comprising details of items that are currently contained in a physical storage section 175 of the smart appliance 100. As described above, smart storage data 460 can be gathered through sensors 180 incorporated in the smart appliance 100 and stored in a smart storage database.

Merchant recipe data 450 can also be provided to the recommendation engine 400. Merchant recipe data 450 comprises a number of recipes, each of which is associated with a given merchant and comprises a list of items. The merchant recipe data 450 can be used to provide recommendations of associated items. In one example, items that are currently in the user's virtual basket are identified. Recipes comprising those items can then be identified from the merchant recipe data from which further items can be identified which belong to one or more of the recipes but are not yet in the user's virtual basket.

In another example, recipes are identified that comprise items that are stored in the physical storage section 175 of the smart appliance 100. In another example, recipes are identified that comprise items that have previously been bought frequently by the user 310.

In some examples, recipes are identified according to a combination of the above factors.

The merchant associated with a given recipe in the merchant recipe data 450 does not necessarily have to be a merchant from whom items can be purchased through the virtual marketplace 200. For example, a recipe could be associated with a restaurant that only operates out of real world premises. Recipes associated with that restaurant could be identified using the user's authorization history data 410, and items associated with those recipes could then be provided to the user 310 as recommendations.

Figure 5:
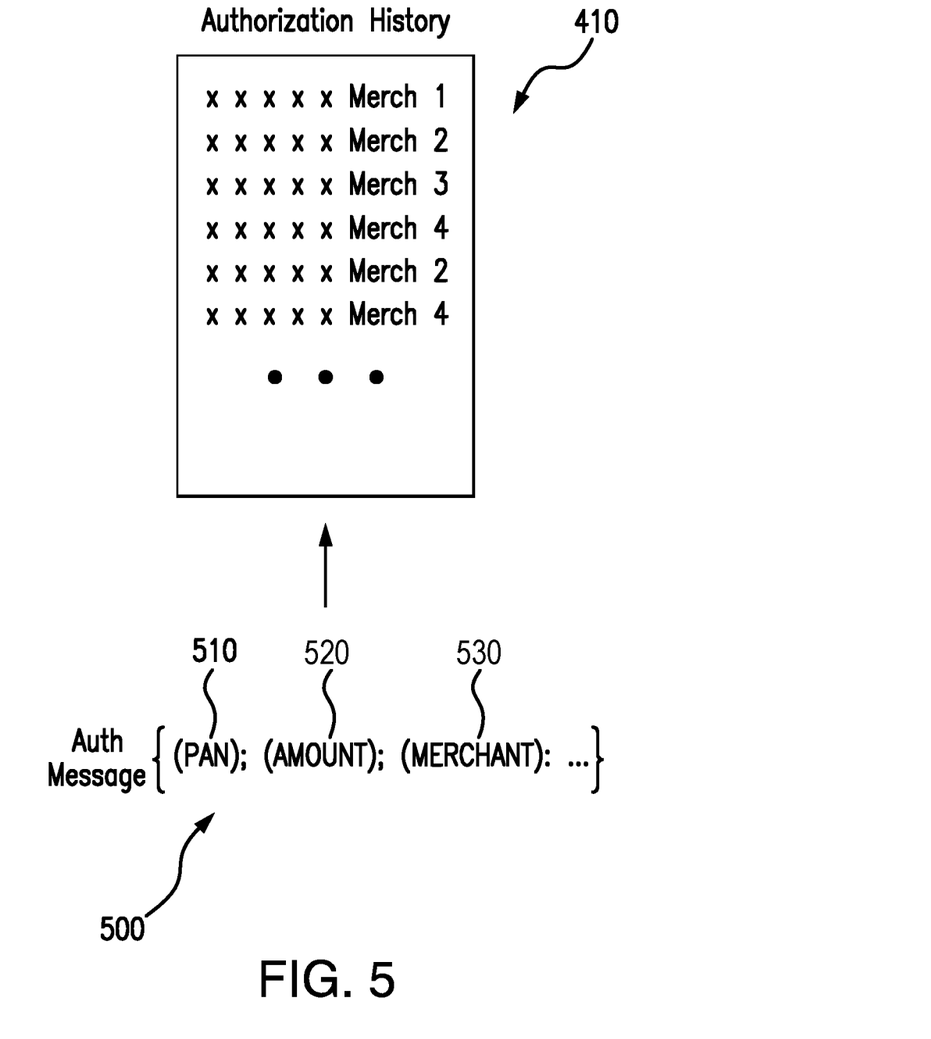
FIG. 5 is a schematic representation of authorization history data in some embodiments.

FIG. 5 shows a representation of the authorization history data 410 that is provided to the recommendation engine 400. Authorization history data 410 comprises data included in the authorization messages 500 sent during previous payment authorizations made using payment cards 330 associated with the digital wallet 320.

When a payment card is used to make a payment, usually one or more authorization messages 500 are sent between financial institutions associated with the sender and receiver of funds and a payment network provider that facilities the card payment.

The authorization messages 500 are usually sent according to a standardized protocol for payment card transaction messages, such as the ISO 8583 protocol. The authorization messages 500 contain a number of fields comprising information relating to the payment, such as a PAN or token PAN field 510 indicating the payment card used to make the payment, a transaction amount field 520 indicating the amount to be transferred, and a merchant field 530 indicating the identity of the recipient of the payment transaction. The skilled person will understand that the authorization messages 500 can comprise many other data fields containing other information relating to the transaction, the exact contents of the authorization message 500 being dependent on the messaging protocol being used. Furthermore, the skilled person would also understand that different authorization messages to those of standard protocols may at times also be used.

In the context of the present disclosure, the user 310 will typically have agreed to allow a payment network provider to collect some or all of the contents of some or all payment authorization messages 500 associated with certain payment cards in order to generate the authorization history data 410.

The authorization history data 410 can comprise a list of every payment authorization message 500 collected in relation to payments made using payment cards 330 associated with a given virtual persona 300. Alternatively, the authorization history data 410 can comprise a subset of the information contained in the payment authorization messages 500. For example, the authorization history data 410 may comprise a list of all the merchants 210 to which payments have been made; the authorization history data 410 could further comprise a list of all the transaction amounts and merchants 210 associated with previous transactions.

Figure 6:
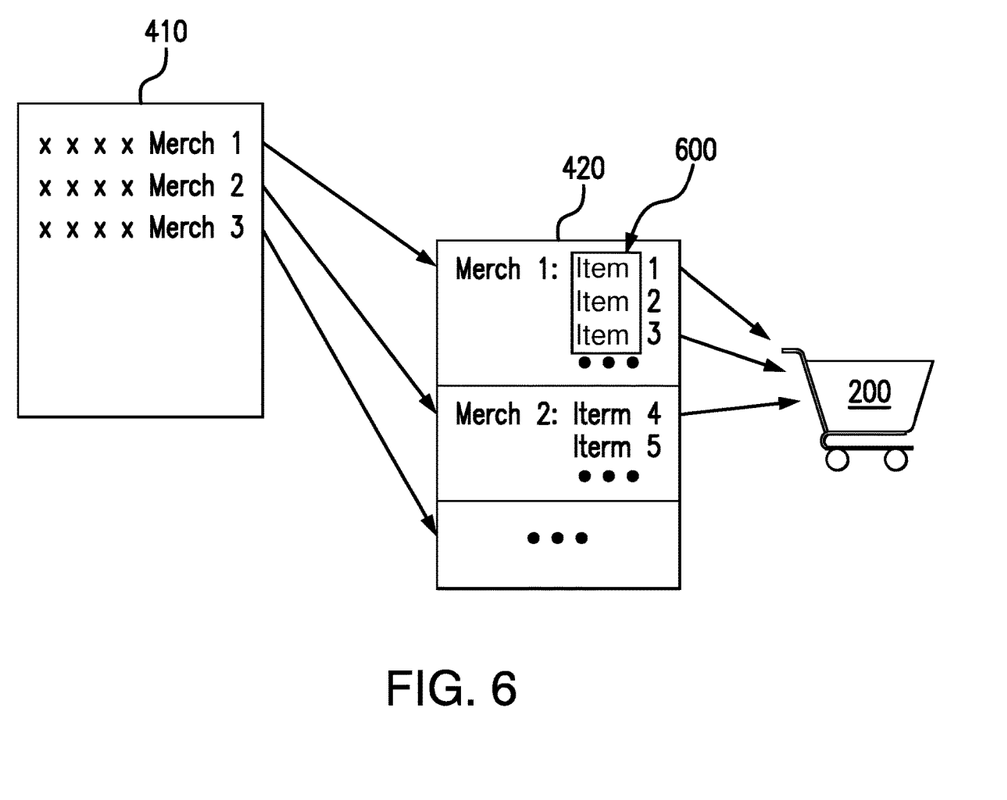
FIG. 6 is a schematic depiction of one example of a method performed by the recommendation engine.

FIG. 6 shows a schematic depiction of one example of a method performed by the recommendation engine 400. First, authorization history data 410 is accessed in order to retrieve a list of merchants 210 to which payments have been made using a payment card 330 associated with the virtual persona 300. Then, the merchant item data 420 is accessed to retrieve a list of available items. Items 600 that are indicated according to the merchant item data 420 as being provided by one of the merchants 210 included in the list of merchants 210 to whom payments have been made are selected by the recommendation engine 400 and provided to the virtual marketplace 200 as purchase recommendations.

In some examples, only a subset of the items 600 are provided as purchase recommendations. A predetermined number of items could be provided as purchase recommendations; for example, 5 items or 10 items. The items recommended can be selected by applying further criteria to initially selected items. For example, items may be ranked in order of how often they have previously been purchased (determined based on the previous purchase data 440), with e.g., the top ranked 10 or 15 items being presented to the virtual marketplace 200 as purchase recommendations.

Figure 7:
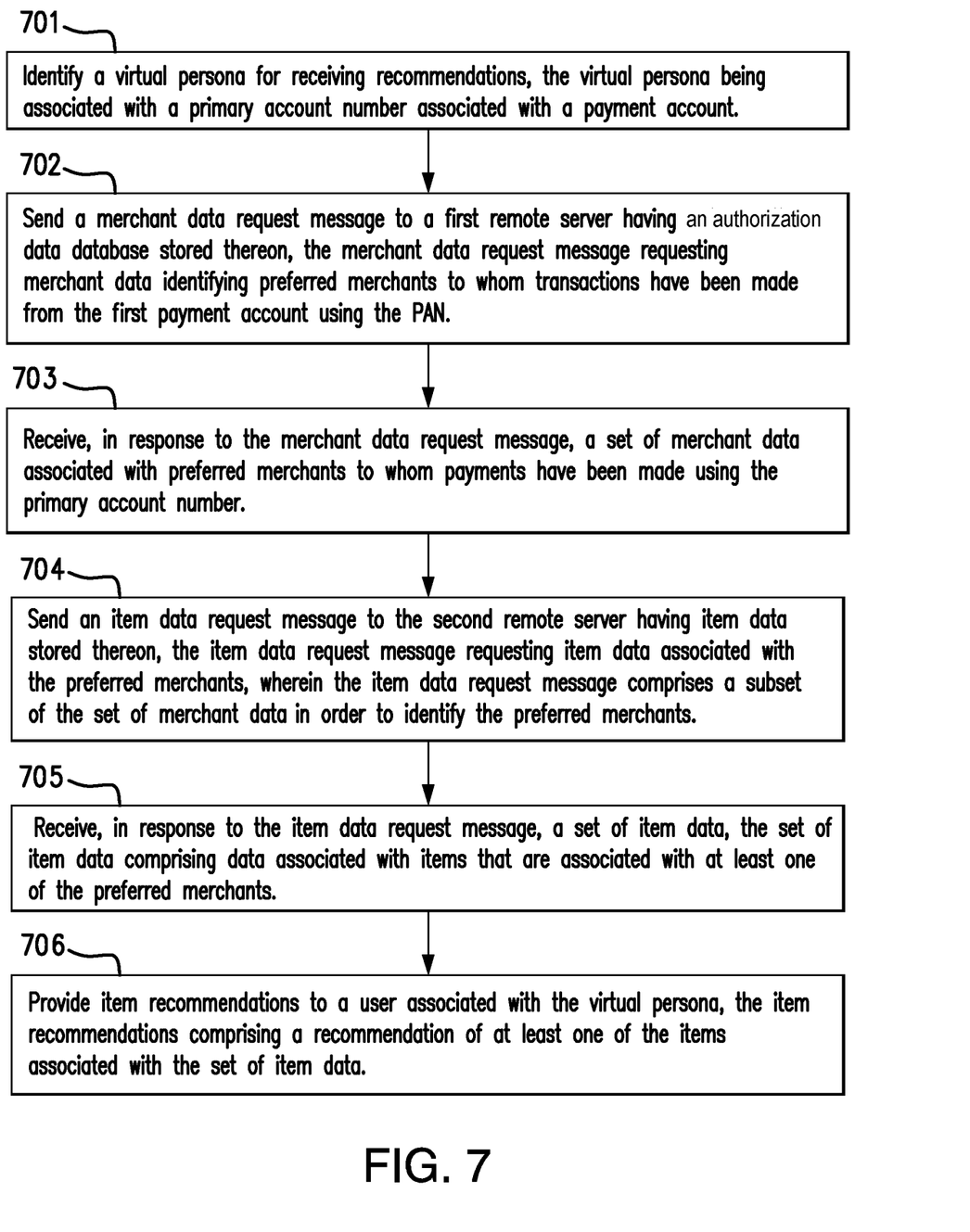
FIG. 7 shows a flow diagram of an example method performed by a server.

FIG. 7 shows a flow diagram of an example method performed by a server according to the present disclosure.

The following steps are performed by a server that forms part of a virtual marketplace 200 which a user has accessed through a computer device, such as a smart appliance.

In step 701, the server identifies a virtual persona associated with a user who has accessed the virtual marketplace 200.

The user can, for example, be identified by entering log-in credentials into the user interface of the smart appliance 100. Alternatively, the smart appliance 100 may provide an identification code identifying the smart appliance 100; the virtual marketplace can then determine the virtual persona 300 to which the smart appliance 100 is registered.

In both examples, the server may identify the virtual persona 300 by accessing a database comprising details of a plurality of virtual personas. The server then identifies the correct virtual persona by comparing the identification code or the log-in credentials with the details associated with the plurality of virtual personas.

In step 702, the server sends a request message to a remote server comprising an authorization history database for authorization history data 410 stored thereon, the message requesting authorization history data 410 relating to transactions associated with at least one of the payment cards 330 associated with the virtual persona 300.

The authorization history data 410 can be for every payment card 330 associated with the virtual persona 300. The authorization history data 410 can comprise a list of merchants 210 associated with payments made from at least one of the payment cards 330.

In step 703, in response to the request message, the server receives a list of merchants 210 to whom payments have been made using a payment card 330 associated with the virtual persona 300.

In step 704, a further request message is sent to a remote server comprising a merchant item database having the merchant item data 420 stored thereon. The further request message requests details of items 600 provided by the merchants 210 included in the list of merchants returned by the initial request sent to the authorization history database.

In step 705, in response to the further request message, the server receives a list of items 600 provided by the merchants 210 included in the list of merchants returned by the initial request sent to the authorization history database.

The request message can include at least one PAN associated with the virtual persona 300 to identify which authorization history data 410 to request. Alternatively, the request message can include an identifier of the virtual persona 300.

The further request message can request details of items belonging to every merchant 210 returned by the initial request message. Alternatively, a subset of the merchants can be selected for use in the second request message; for example, the subset may consist of the 5 merchants to whom most payments have been made using payment cards associated with the virtual persona 300.

In step 706, the recommendation engine 400 then provides a recommendation to the user 310 of one or more items 600 on the list of items returned by the further request message.

Figure 8:
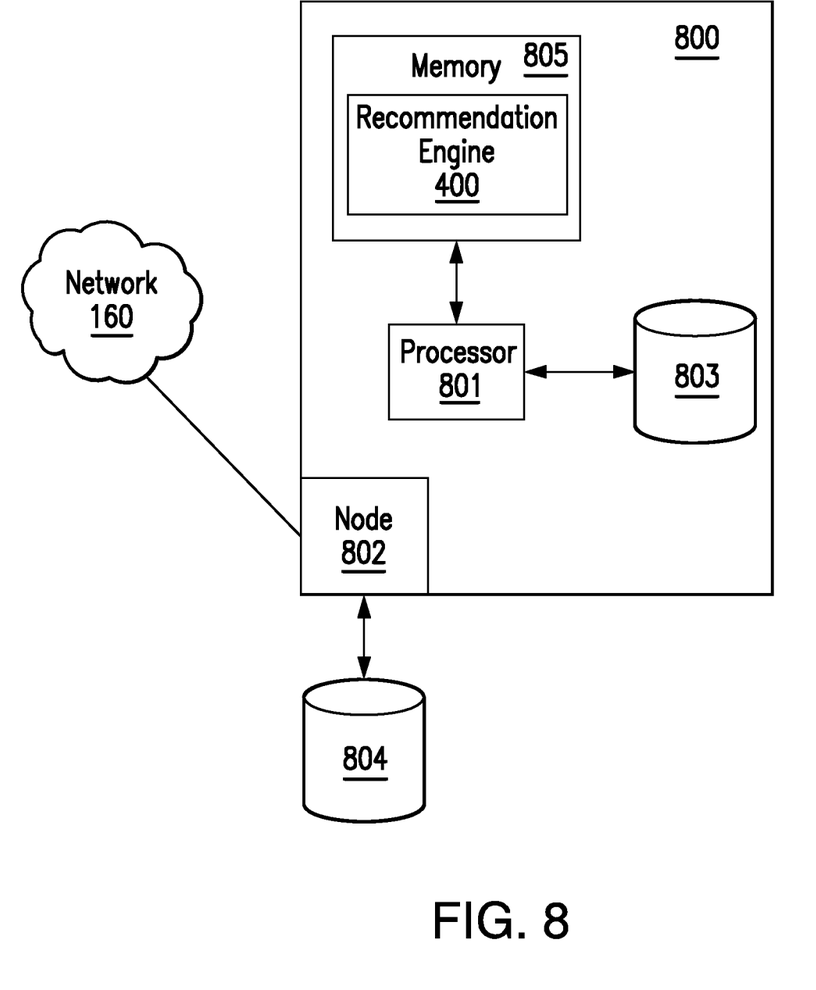
FIG. 8 is a schematic diagram of a computing system suitable for performing examples of the present disclosure.

FIG. 8 shows a schematic diagram of a computing system 800 suitable for performing the above described method.

The computing system 800 may include a computer processor 801 operatively coupled to a communication node 802, and a storage device 803. The communication node 802 may be in communication with external storage devices 804 and external computing systems. The communication node 802 is in communication with network 160.

The computing system comprises memory 805 having stored thereon a recommendation engine 400 configured to instruct the processor 801 to implement algorithms required to perform the steps described above.

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, CDs (compact discs), DVDs (digital versatile discs), or other media that are capable of storing code and/or data.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

Receivers and transmitters as described herein may be standalone or may be comprised in transceivers. User input devices can include, without limitation, microphones, buttons, keypads, touchscreens, touchpads, trackballs, joysticks and mice. User output devices can include, without limitation, speakers, graphical user interfaces, indicator lights and refreshable braille displays. User interface devices can comprise one or more user input devices, one or more user output devices, or both.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for providing item recommendations to a user, the method comprising:

identifying, at a first server, a virtual persona for receiving recommendations, the virtual persona being associated with a primary account number (PAN) associated with a payment account;

sending, to a first remote server having an authorization data database stored thereon, a request for merchant data;

receiving, in response to the request, from the first remote server, a set of merchant data associated with preferred merchants to whom payments have been made using the PAN;

sending, to a second remote server having a merchant item database stored thereon, a request for item data associated with the preferred merchants, wherein the request for item data comprises a subset of the set of merchant data, whereby the preferred merchants are identifiable based on the subset of the set of merchant data;

receiving, in response to the request for item data, from the second remote server, a set of item data, the set of item data associated with merchant items that are associated with at least one of the preferred merchants;

identifying a recipe associated with one or more user items included in a virtual shopping basket for a user associated with the virtual persona;

determining that at least one of the merchant items is included in the identified recipe, but not included in the virtual shopping basket; and providing an item recommendation to the user associated with the virtual persona, the item recommendation comprising a recommendation of the at least one of the merchant items.

2. The computer implemented method of claim 1, further comprising:

sending, to a third remote server having a merchant recipe database stored thereon, a request for recipe data, wherein the request for recipe data comprises a subset of the set of merchant data, whereby the preferred merchants are identifiable based on the subset of merchant data included in the request for recipe data; and receiving, in response to the request for recipe data, from the third remote server, a set of recipe data, the set of recipe data comprising multiple recipes associated with at least one of the preferred merchants, each recipe comprising a list of recipe items; and wherein identifying the recipe includes identifying the recipe from the set of recipe data.

3. The computer implemented method of claim 2, further comprising receiving, from a fourth remote server, smart storage data indicative of one or more user items included in a smart appliance associated with the user and identified by a sensor included in the smart appliance;

wherein identifying the recipe includes identifying the recipe from the set of recipe data based on at least the virtual shopping basket and the smart storage data; and wherein the method further comprises determining that at least one of the merchant items is not included in the smart storage data, prior to providing the item recommendation to the user.

4. The computer implemented method of claim 3, wherein the first, second, third and fourth remote servers are the same remote server.

5. The computer implemented method of claim 1, wherein the request for merchant data comprises either the PAN or a token PAN associated with the PAN.

6. The computer implemented method of claim 1, wherein:

the virtual persona is associated with an additional PAN, the additional PAN being associated with either the payment account or an additional payment account; and the request for merchant data includes a request for merchant data identifying the preferred merchants to whom transactions have further been made using the additional PAN.

7. The computer implemented method of claim 6, wherein the request for merchant data comprises a persona identifier identifying the virtual persona.

8. The computer implemented method of claim 1, wherein the subset of the set of merchant data is the entirety of the set of merchant data.

9. The computer implemented method of claim 1, wherein providing the item recommendation to the user comprises adding the at least one of the merchant items to the virtual shopping basket.

10. The computer implemented method of claim 1, wherein providing the item recommendation to the user comprises presenting to the user, via an interface of a computing device, an option of adding the at least one of the merchant items to the virtual shopping basket.

11. A computer system for providing item recommendations to a user, the computer system comprising a processor configured to:

identify a virtual persona for receiving recommendations, the virtual persona being associated with a primary account number (PAN) associated with a payment account;

send, to a first remote server having an authorization data database stored thereon, a request for merchant data;

receive, in response to the request for merchant data, from the first remote server, a set of merchant data associated with preferred merchants to whom payments have been made using the PAN;

send, to a second remote server having a merchant item database stored thereon, a request for item data associated with the preferred merchants, wherein the request for item data comprises a subset of the set of merchant data, whereby the preferred merchants are identifiable based on the subset of the set of merchant data;

receive, in response to the request for item data, from the second remote server, a set of item data, the set of item data associated with merchant items that are associated with at least one of the preferred merchants;

identify a recipe associated with one or more user items included in a virtual shopping basket for a user associated with the virtual persona;

determine that at least one of the merchant items is included in the identified recipe, but not included in the virtual shopping basket; and provide an item recommendation to the user associated with the virtual persona, the item recommendation comprising a recommendation of the at least one of the merchant items.

12. The computer system of claim 11, wherein the request for merchant data comprises either the PAN or a token PAN associated with the PAN.

13. The computer system of claim 11, wherein:

the virtual persona is associated with an additional PAN, the additional PAN being associated with either the payment account or an additional payment account; and the request for merchant data includes a request for merchant data identifying the preferred merchants to whom transactions have further been made using the additional PAN.

14. The computer system of claim 13, wherein the request for merchant data comprises a persona identifier identifying the virtual persona.

15. The computer system of claim 11, wherein the subset of the set of merchant data is the entirety of the set of merchant data.

16. The computer system of claim 11, wherein the processor is configured, in order to provide the item recommendation to the user, to add the at least one of the merchant items to the virtual shopping basket.

17. The computer system of claim 11, wherein the processor is configured, in order to provide the item recommendation to the user, to present to the user, via an interface, an option to add the at least one of the merchant items to the virtual shopping basket.

18. The computer system of claim 11, wherein the processor is further configured to receive, from a further remote server, smart storage data indicative of one or more user items included in a smart appliance associated with the user persona;

wherein the processor is configured, in order to identify the recipe, to identify the recipe from a set of recipe data, based on at least the virtual shopping basket and the smart storage data; and     wherein the processor is further configured to determine that at least one of the merchant items is not included in the smart storage data, prior to providing the item recommendation to the user.

\* \* \* \* \*